US007650220B2

(12) United States Patent
Marszalek

(10) Patent No.: US 7,650,220 B2
(45) Date of Patent: Jan. 19, 2010

(54) METHOD FOR ANTI-ALIAS DUAL PROCESSING LOOP DATA ACQUISITION IN AN INTERNAL COMBUSTION ENGINE

(75) Inventor: Gary Allen Marszalek, South Lyon, MI (US)

(73) Assignee: Detroit Diesel Corporation, Detroit, MI (US)

( * ) Notice: Subject to any disclaimer, the term of this patent is extended or adjusted under 35 U.S.C. 154(b) by 220 days.

(21) Appl. No.: 11/944,881

(22) Filed: Nov. 26, 2007

(65) Prior Publication Data

US 2009/0138171 A1 May 28, 2009

(51) Int. Cl.
*G06F 19/00* (2006.01)

(52) U.S. Cl. ...................................................... 701/102

(58) Field of Classification Search ................ 701/102, 701/101, 110, 115

See application file for complete search history.

(56) References Cited

U.S. PATENT DOCUMENTS 4,791,584 A 12/1988 Greivenkamp, Jr.
5,233,546 A 8/1993 Witte
5,534,948 A 7/1996 Baldwin
5,778,329 A * 7/1998 Officer et al. ................. 701/55
5,864,311 A 1/1999 Johnson et al.
6,252,916 B1 6/2001 Wiegand
7,046,183 B2 5/2006 Bilinskis et al.
7,054,738 B1 * 5/2006 Stotsky ....................... 701/115
7,072,804 B2 7/2006 Weller
7,181,339 B2 2/2007 Remelman
RE39,693 E 6/2007 Pupalaikis
7,233,963 B2 6/2007 Snyder
7,467,625 B1 * 12/2008 Wu et al. .................... 123/575

* cited by examiner

*Primary Examiner*—Hieu T Vo
(74) *Attorney, Agent, or Firm*—Bill C. Panagos; Rader, Fishman & Grauer, PLLC

(57) ABSTRACT

A method to operate an electronic controlled internal combustion engine with an electronic controller having memory and tables resident therein to obtain and use sensor data beyond the Nyquist threshold.

6 Claims, 5 Drawing Sheets

METHOD FOR ANTI-ALIAS DUAL PROCESSING LOOP DATA ACQUISITION IN AN INTERNAL COMBUSTION ENGINE

TECHNICAL FIELD OF THE INVENTION

Engine controller modules typically become limited in high speed acquisition and processing resources as the plurality of individual analog inputs increase. Normally such input signals are ideally represented by a "noise free" D.C. voltage, representative of an external parameter being sensed. Under such ideal conditions, low data acquisition sampling rates, such as 100 Hz, are typically adequate when proper anti-aliasing filters are employed.

However, this is not always the case with external signals having super imposed AC components, containing critical Nyquist frequency content. Furthermore, resources to digitally process and filter vast amounts of external data at appropriate higher Nyquist compliant sampling rates, can then present an insurmountable anti-alias performance challenge. Normally digital filtering loops perform adequately at 2.5 times the highest sensed frequency content being sampled.

In one embodiment, the present invention is directed to a method that maintains ideal mono-periodic Nyquist compliant filtered signal magnitude accuracy, across a bi-periodic method, whose processor friendly slower periodic is below compliance. The result is enhanced data acquisition performance with reduced high speed processing. The present invention further describes a high speed (e.g. 2 kHz), low resource demanding sampling procedure that includes a block averaging and down-sampling step is required for maintaining single loop anti-aliasing integrity before transferring individual data for further low speed (e.g. 100 Hz) digital filter processing.

SUMMARY OF THE INVENTION

The present invention, in one aspect is directed to a method to operate an electronically controlled internal combustion engine having an electronic controller with memory to obtain and use sensor data beyond a processing loops Nyquist frequency threshold by utilizing a high speed (e.g. 2 kHz), but a low resource demanding sampling procedure that eliminates the magnitude aliasing error phenomena. The bi-periodic method includes sampling sensor data signals at a high speed (i.e., 2 kHz), within a predetermined period of time (i.e. 10 ms) and determining whether it is time to hand sensor signal values over to a second low speed processing loop for further digital processing of sensor signal data. Preferably, the digital processing occurs at a low more manageable periodic rate (i.e., 100 Hz) in the electronic controller. If it is determined that insufficient time has elapsed, the digitally sampled sensor signal data is added to a registry in memory of an engine controller. If it is determined sufficient time has elapsed, the method determines the number of times a sensor signal value was added to the register. The method loads the registry containing the accumulated total sum of all added values in the registry and then divides that total by the number of times the values were added to the register. A digital filter can then function effectively at a lower speed loop rate (e.g. 100 Hz). This preserves each value to filter from an aliasing error magnitude.

In the method described, the frequency of the filtered signal may vary, but the amplitude of the filtered signal is in an ideal range. The amplitude is calibratable for the ideal amplitude depending upon sensor signals and engine operation.

DETAILED DESCRIPTION OF THE PREFERRED EMBODIMENT

Figure 1:
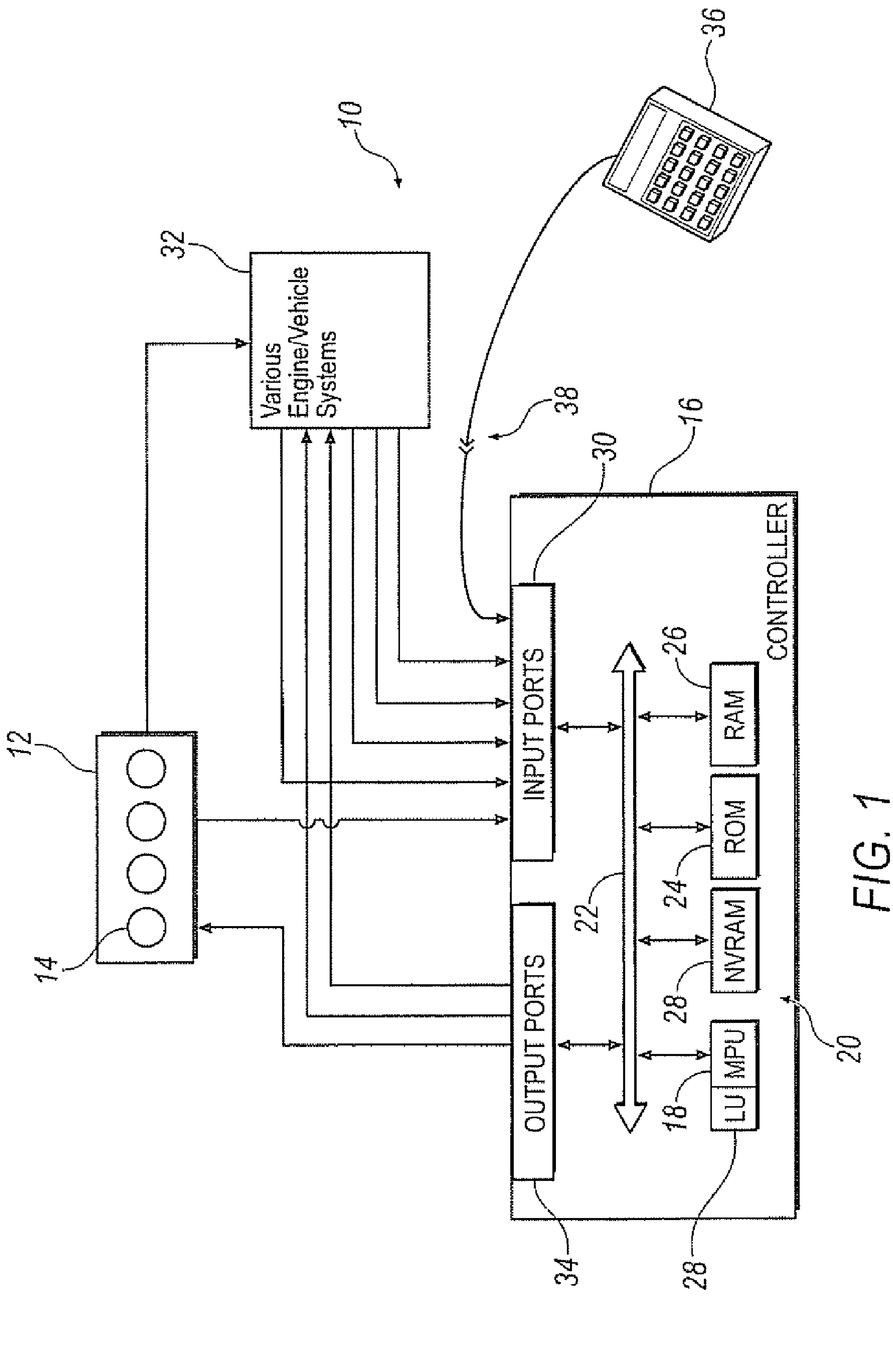
FIG. 1 is a schematic view of an engine, a controller and various remote systems from which sensor data is transmitted to the controller.

Turning now to the drawings wherein like numbers refer to like structures, FIG. 1 is a schematic representation of an internal combustion engine, an electronic controller, and various remote systems with sensors for transmission of sensor data signals to the controller. Schematically represented therein is a perspective view illustrating a compression-ignition internal combustion engine system 10 incorporating various features according to the present invention is shown. The engine 12 may be implemented in a wide variety of applications including on-highway trucks, construction equipment, marine vessels, stationary generators, pumping stations, and the like. The engine 12 generally includes a plurality of cylinders disposed below a corresponding cover, indicated generally by reference numeral 14.

In a preferred embodiment, the engine 10 is a multi-cylinder compression ignition internal combustion engine, such as a 3, 4, 6, 8, 12, 16, or 24 cylinder diesel engine. However, the engine 12 may be implemented having any appropriate number of cylinders 14, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankin cycle, Miller cycle, etc.) using an appropriate fuel to meet the design criteria of a particular application.

A controller 16 preferably comprises a programmable microprocessor 18 in communication with (i.e., coupled to) various computer readable storage media 20 via at least one data and control bus 22. The computer readable storage media 20 may include any of a number of devices such as read only memory (ROM) 24, random access memory (RAM) 26, and non-volatile (keep-alive) random access memory (NVRAM) 28. Specifically, the controller, or Electronic Control Unit (ECU) may be comprised of a Common Powertrain Controller (CPC2) and a motor control module as will be described in greater detail in FIG. 2.

The various types of computer-readable storage media 20 generally provide short-term and long-term storage of data (e.g., at least one lookup table, LUT, at least one operation control routine, at least one mathematical model for EGR control, etc.) used by the controller 16 to control the engine 10. The computer-readable storage media 20 may be implemented by any of a number of known physical devices capable of storing data representing instructions executable by the microprocessor 18. Such devices may include PROM, EPROM, EEPROM, flash memory, and the like in addition to various magnetic, optical, and combination media capable of temporary and permanent data storage.

The computer-readable storage media 20 may include data representing program instructions (e.g., software), calibrations, routines, steps, methods, blocks, operations, operating variables, and the like used in connection with associated hardware to control the various systems and subsystems of the engine 10, and the vehicle. The computer readable storage media 20 generally have instructions stored thereon that may be executable by the controller 16 to control the internal combustion engine 10. The program instructions may direct the controller 16 to control the various systems and subsystems of the vehicle where the engine 12 is implemented, with the instructions being executed by microprocessor 20, and optionally, instructions may also be executed by any number of logic units 28. The input ports 30 may receive signals from the various engine and vehicle systems, including sensors and switches generally designated at 32, and the controller 16 may generate signals (e.g., the signals ACT and ADJ) at output ports 34. The output signals are generally presented (or transmitted) to the various vehicle components.

A data, diagnostics, and programming interface 36 may also be selectively connected to the controller 16 via a bus and connector 38 to exchange various information therebetween. The interface 36 may be used to change values within the computer readable storage media 20, such as configuration settings, calibration variables, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 36 selectively connected via an appropriate plug or connector 38 to the controller 16.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 16 may receive signals from the various vehicle sensors and switches, and execute control logic embedded in hardware and software to control the engine 12, various engine and vehicle systems 32, and the like. In one example, the controller 16 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 16, in addition to and by any of the various systems and subsystems of the vehicle or other installation where the controller 16 is implemented. Yet further, although in a preferred embodiment, the controller 16 includes the microprocessor 20, any of a number of known programming and processing techniques, algorithms, steps, bocks, processes, routines, strategies and the like may be implemented to control the engine 12, and the various engine and vehicle components 32. Further, the engine controller 16 may receive information in a variety of ways. For example, engine 12 systems information may be received over a data link, at a digital input, or at a sensor input of the engine controller 16.

Figure 2:
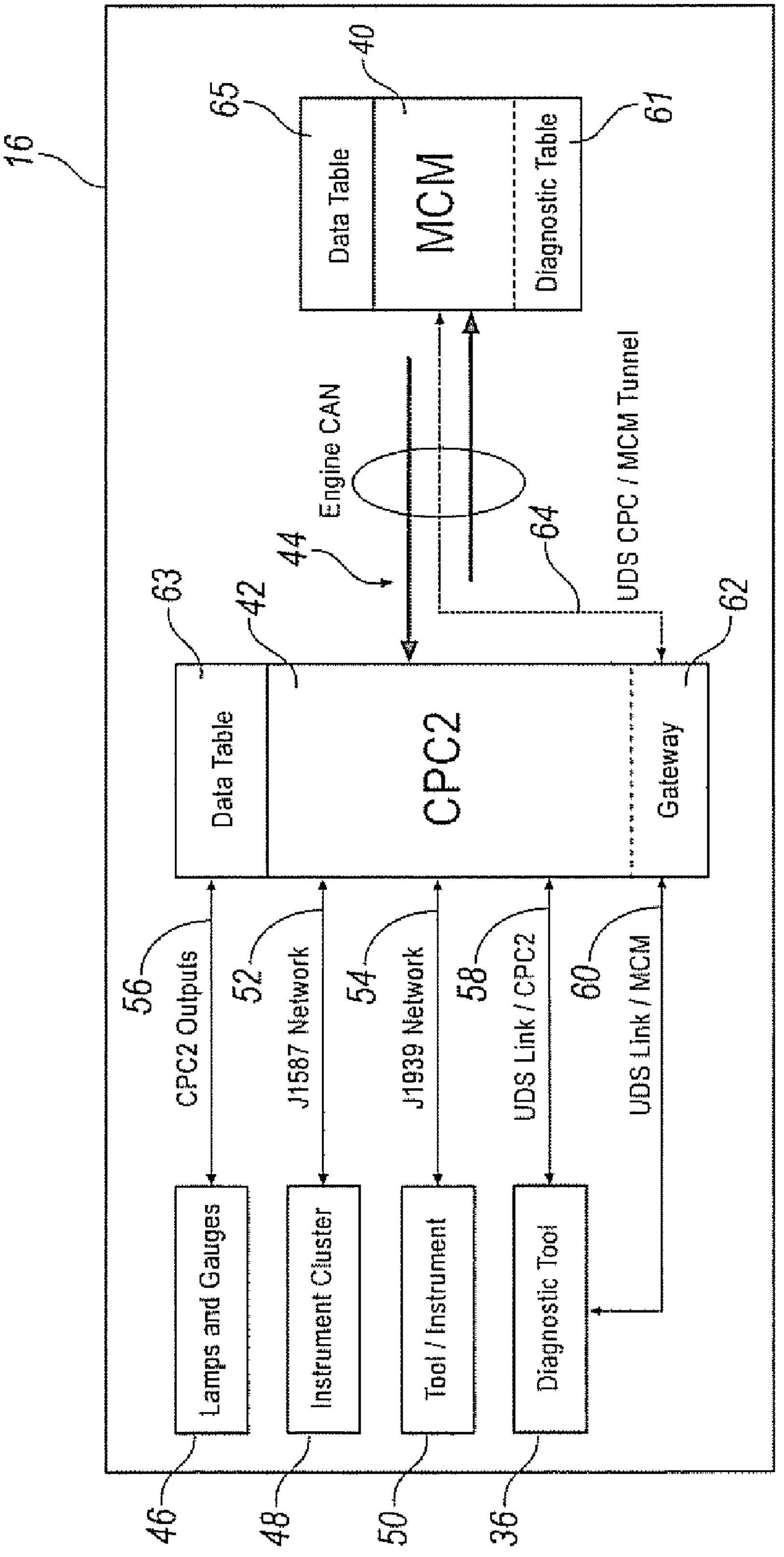
FIG. 2 is a schematic representation of an engine controller useful in one method according to the present invention.

FIG. 2 is a detailed schematic view of the ECU, showing the Common Powertrain Controller, the Motor Control Module and some of their respective electronic connections. Where a control unit of two modules is described, it is understood that a single control module having the described functionality may be employed.

Specifically, ECU 16 may be comprised of a Common Powertrain Controller (CPC2) 42 and Motor Control Module (MCM) 40 in electronic communication over an engine computer area network (ECAN) 44. The MCM and CPC2 preferably utilize a unified diagnostic server (UDS) protocol over the ECAN data link. The MCM is in electronic communication with various auxiliary systems, each of which is associated with the operation of engine and vehicle over a computer area network. The communication between the CPC2 and the MCM is two way and constant. Within the CPC2 is a data synchronization table 62 that acts as the gateway between a diagnostic tool 36 and the MCM. The gateway table is synchronized over the UDS to a diagnostic table 61 resident in the MCM at every ignition cycle. The CDC is electronically connected to the lamps and gauges 46, instrument cluster 48, tools and instruments 50 and diagnostic tools 36. The CPC2 communicates with the lamps and gauges, instrument cluster, and the common area network (CAN) 44, over SAE data links J1587 and SAE data link J1939, labeled 52 and 54, respectively. The diagnostic tool is in electronic communication with the CPC2 via the UDS data link 58. In addition the diagnostic tool is in electronic communication via a UDS data link with the MCM through the diagnostic gateway 62. The gateway is in communication with the MCM DTC table 61 and, synchronizes the diagnostic trouble code (DTC) tables in the CPC2 with the MCM at each ignition cycle. The CPC2 and the MCM are programmed with at least minimum versions of software supporting an automated DTC. Resident in the MCM or the CPC2 is at least one table 63 and 65, respectively, capable of being populated with values representative of the method for engine operation according to the present invention.

Figure 3:
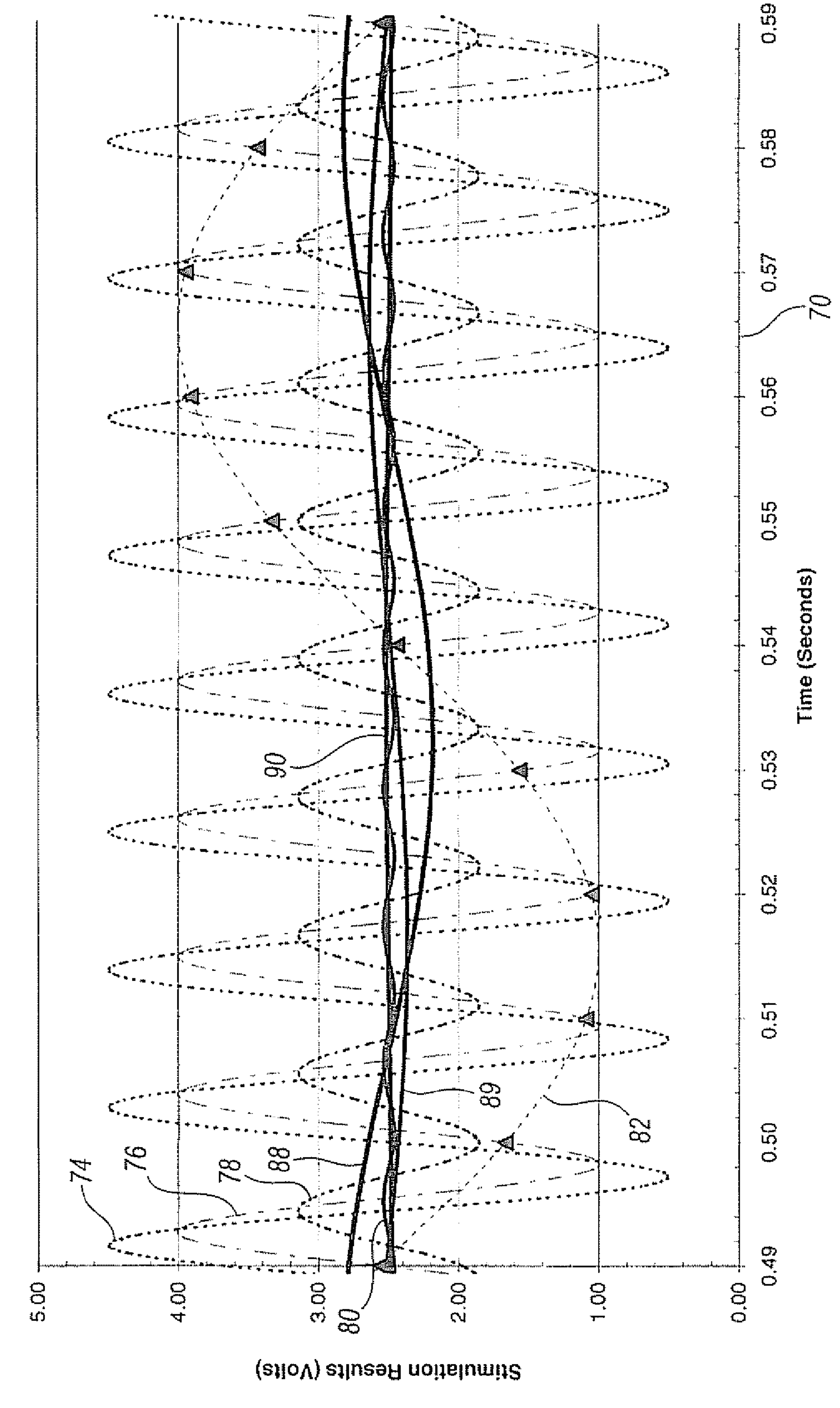
FIG. 3 is a graph representing signals received from various sensors demonstrating the controller input aliasing evaluation according to one method of the present invention.

FIG. 3 is a graph of the controller input aliasing evaluation. Specifically graph 68 has x axis 70, divided into units of time, specifically seconds, and y axis 72 showing results in volts. Signal curve 74 is representative of the raw sensor data from normal engine operation. The amplitude of the data signal curve exceeds the Nyquist threshold for useable data and is generally unusable without some kind of filtering occurring.

Sine curve 76 is indicative of the engine signal data after applying typical anti-alias filtering from the controller as is known in the art. The amplitude of the data signal curve is reduced somewhat from the raw signal data curve 74, but still contains critical Nyquist content and is generally not useable without additional response depriving global bandwidth filtering tactics.

Sine curve 78 is indicative of the engine signal data after applying a low-pass pre-filtering to the data by a single data Temic low resource pre-filter available from Continental AG. The Temic pre-filter samples at a rate of 2 kHz and has an exponent coefficient of 3, producing a cut off frequency of approximately 45 Hz. The amplitude is substantially reduced from the controller initiated filter and the raw signal data, but the pre-filtered signal amplitude can still exceed the Nyquist threshold of the low speed (i.e. 100 Hz) digital processing loop.

Sine curve 80 is representative of an ideal signal data curve that is difficult or impossible to achieve using current engine controllers without significant resources devoted to filtering of the engine data signals. It is felt that such resources are not within the capability of current engine controllers and that to achieve such results, more expensive and powerful engine controllers would be employed and would necessarily result in increased costs to manufacturers. The issue to be resolved is how current controllers can achieve filtering results that approach the ideal values represented by curve 80, which is only achievable using a mono-periodic single filter at a high rate of about 2 kHz.

In the past, a non-compliant (i.e. 90 Hz) raw data signal represented by curve 74 was merely subjected to a typical RC anti-alias filter then mono-periodically sampled at 100 Hz, as represented by curve 82. The engine controller will unfortunately acquire a phantom lower frequency transposed alias (i.e. 10 Hz) signals from data points 69, 71, 73, 75, 77, 79, 81, 83, 85, and 86, respectfully.

Sine curve 88 is representative of the 10 Hz aliased phantom signal data after the raw data points 69 through 86, respectively have been filtered. Sine curve 89 is representative of the Temic 2 kHz pre-filtered signaled data after it has respectively been digitally filtered. However, it should be noted that as resulting phantom error frequencies approach that of 0 Hz (DC), further low pass digital filter processing completely breaks down. The variable magnitude error of near DC phantom signals produced from input signals at or near multiples of the period rate (i.e. 100 Hz), are only bound to their initial process loop input signal amplitude levels. Therefore, the allowable error peak-to-peak amplitude boundaries are best represented by anti-aliasing RC filter curve 76 and curve 78 for the 2 kHz Temic pre-filter solution respectively.

Sine curve 90 is representative of the final amplitude and frequency after the dual filtering process of the present invention has been achieved. While it is apparent that the final curve is not identical to the ideal curve represented by curve 80, its maximum signal magnitude error level is always bound within that of the ideal curve 80. The engine controller is thus able to use the data contained therein to operate the engine, as the recovered data no longer maintains the Nyquist magnitude error characteristic.

Figure 4:
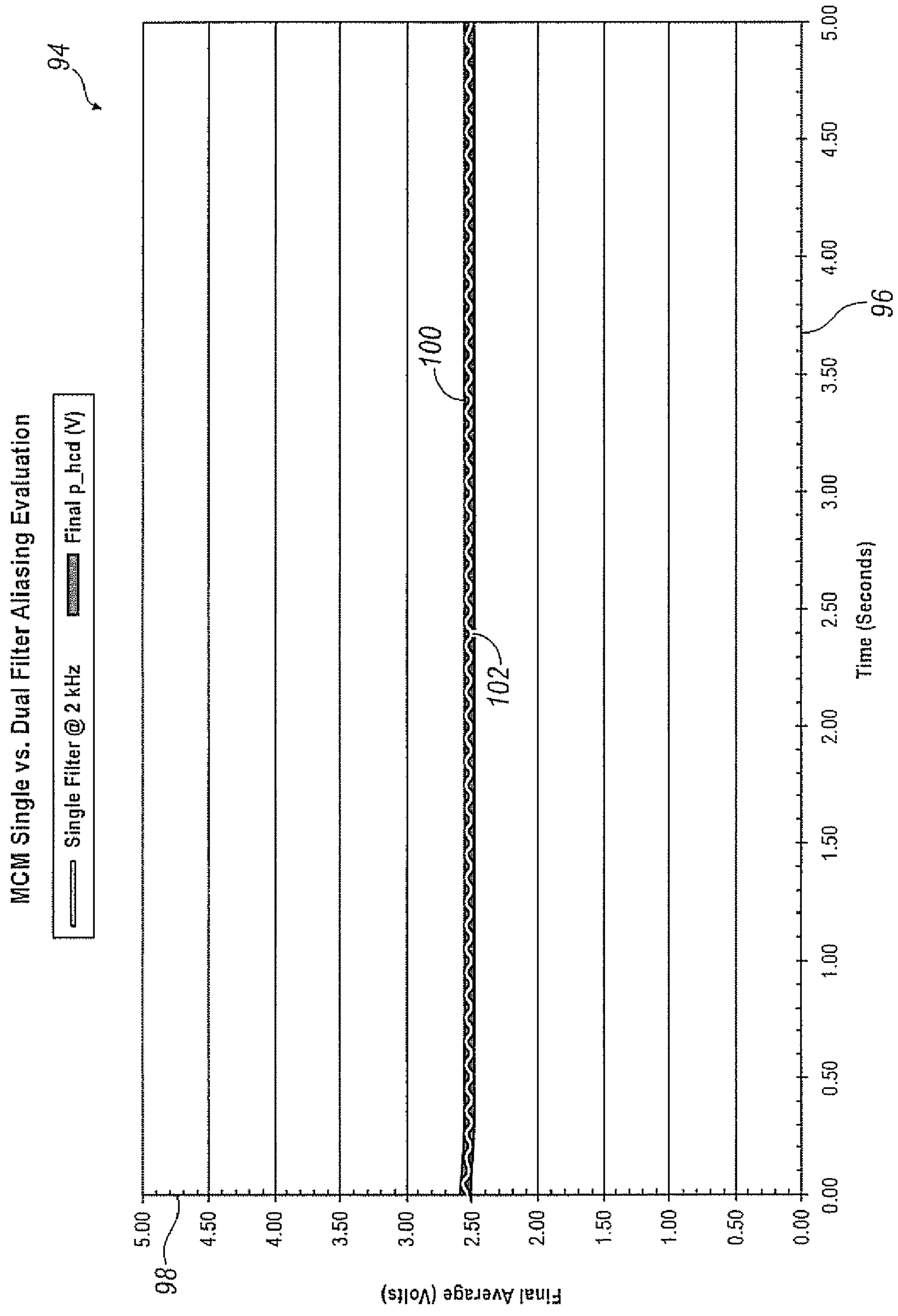
FIG. 4 is a graph representing single v. dual filter aliasing evaluation according to one aspect of the present invention.

Turning to FIG. 4, the signal achievable at a single filtering at 2 kHz can be seen. Graph 94 has an x axis 96, divided in units of time such as seconds, and y axis 98 divided into units of voltage, such as the final average in volts of the data seen in the graph of FIG. 3. Line 100 is representative of data of a single filter at a high rate, such as at about 2 kHz. After all the data signals are subjected to at least one method of the dual filter aliasing evaluation of the present invention, the line 102 is produced with an amplitude well within the range of line 100 and a frequency measured in 10ths of a second. In this manner, data normally unavailable for use because it exceeds a processing loops Nyquist limit is now available for use as it is filtered to be within the ideal range as defined by line 100.

Figure 5:
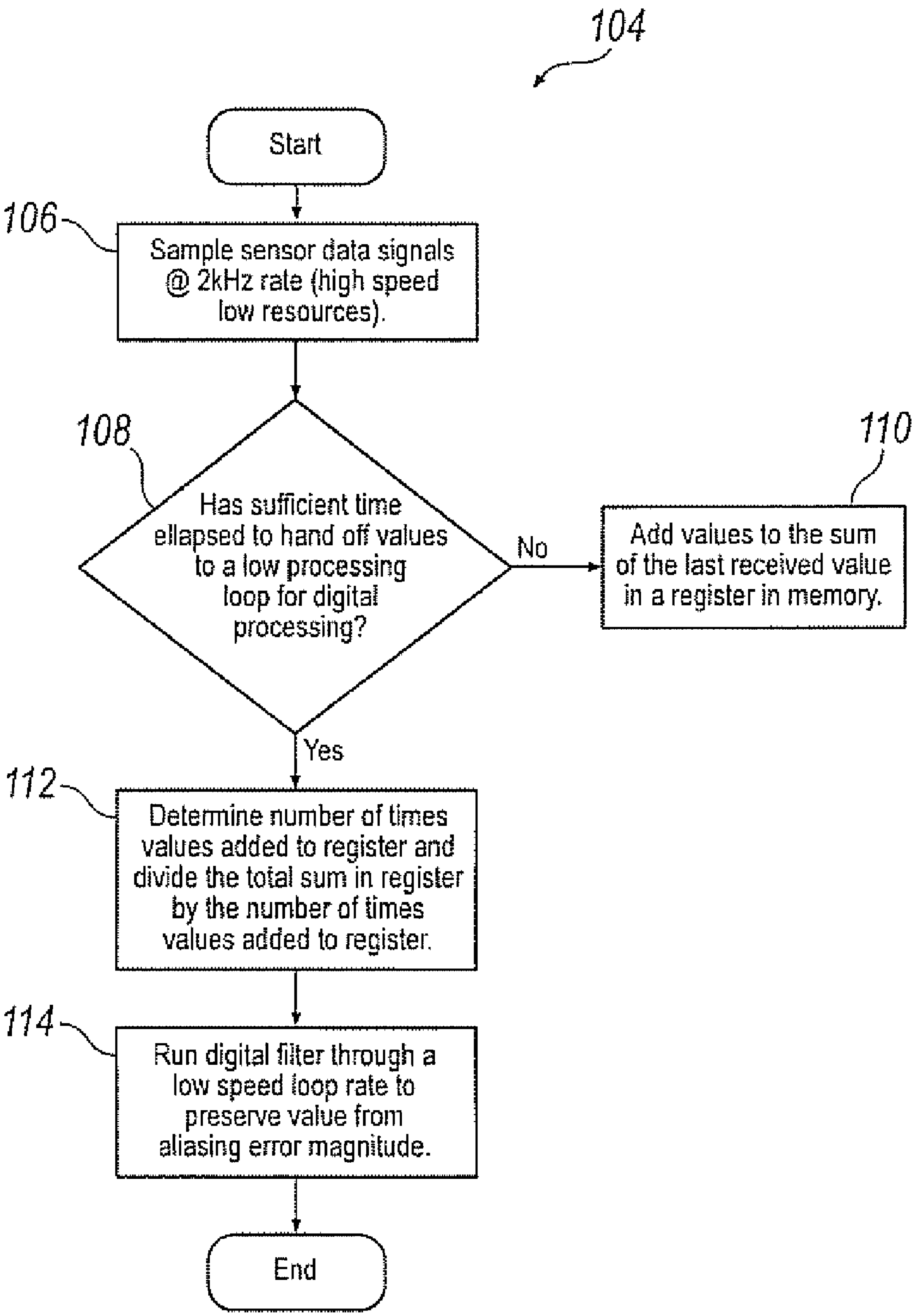
FIG. 5 is a software flow chart representing one method according to the present invention.

FIG. 5 is a software flow chart representing one method 104 according to the present invention. Specifically, step 106 is sampling sensor data signals at a high rate, (i.e., 2 kHz) low resource data acquisition process. Generally, data signals from sensors are analog signals in DC. The DC sensor signals are sampled in a high speed, low resource data acquisition process.

Step 108 is determining whether a sufficient period of time has elapsed to hand off sensor data values to a low speed high resource data loop. If not, the data value is added to a table or registry in memory in the controller, as seen in step 110. In this case, the MCM stores the values in a registry. If it is determined that a sufficient time has elapsed, the values are passed to a low speed loop for further filtering. Step 112 shows what happens in such a low speed loop. In particular the loop requested input sum prepares the data for hand off to a digital filter loop. The input total sum is divided by the input processed count to determine the numerical average. The numerical average is passed through a low speed loop digital filter for processing. The registry in the controller memory is then reset and the sample sum process controller is re-set to zero. Note that when individual loop processing notes are already known (e.g. 2 kHz and 100 Hz) a sum process counter is not mandatory. By simply dividing the accumulated sum by the known amount of intermediate samples, (e.g. 1/(2000 Hz/100 Hz)=20), an equivalent sum process counter can be determined for proper averaging. Step 114 is digitally filtering the quotient from step 112 through a low speed loop rate (i.e., 100 Hz) to preserve the quotient value from aliasing error magnitude.

The method of the described invention is a acquisition method of block averaging high rate (i.e., 2 kHz) sampled data for further digital processing and filtering at reduced operating loop rates (i.e., 100 Hz). The method requires minimal controller resources. The method includes summing, then averaging each targeted analog channel high speed (i.e, 2 kHz) data samples (approx 20 each) that occur between the low frequency (i.e., 100 Hz) digital filter up-date rate. By dividing each individual analog channel's high speed accumulated sums by the number of summed samples (e.g., 20), optimal filtering is obtained.

At least one embodiment of the invention is described herein. The words used are understood to be words of description, not words of limitation. Many variations and modifications are possible without departing from the scope and spirit of the invention as set forth in the appended claims.

What is claimed as new and desired to be protected by Letters Patent of the United States is:

1. A method to operate an electronic controlled internal combustion engine with an electronic controller having memory and tables resident to obtain and use sensor data beyond a Nyquist frequency threshold, comprising:

sampling a number of sensor data at high speed rate and applying low resource demand computing capability rate within a predetermined period of time;

processing said data signals in low processing loop to determine at least one value indicative of engine operation and adding said values to at least one table resident in memory determining whether sufficient time has elapsed to initiate further processing of data signals;

determining the sum of the values in said tables and dividing said sum by number of times values are added to said tables to determine a quotient;

digitally filtering said quotient through a low loop rate to substantially filter any aliasing error magnitude from said data signals.

2. The method of claim 1, wherein said high speed rate is 2 kHz.

3. The method of claim 1, wherein said low loop rate digital filter processing rate is 100 Hz.

4. The method of claim 1, wherein said predetermined period of time is 10 ms.

5. The method of claim 1, wherein values are added to tables in memory if it is determined insufficient time has elapsed.

6. The method of claim 1, wherein the number of summed samples is 20.

* * * * *